United States Patent [19]

Roznovsky

[11] 4,161,166

[45] Jul. 17, 1979

[54] DEVICE FOR SELECTIVELY CONTROLLING THE NUMBER OF OPERATIVE CYLINDERS IN MULTI-CYLINDER INTERNAL COMBUSTION ENGINES

[76] Inventor: Frank B. Roznovsky, 1911 Margaret, Houston, Tex. 77093

[21] Appl. No.: 859,199

[22] Filed: Dec. 9, 1977

[51] Int. Cl.² ........................................... F02D 13/06
[52] U.S. Cl. ................................. 123/198 F; 123/182
[58] Field of Search ............. 123/198 F, 90.16, 90.32, 123/182

[56] References Cited

U.S. PATENT DOCUMENTS

| | | | |
|---|---|---|---|
| 1,201,055 | 10/1916 | Jones | 123/198 F |
| 1,985,447 | 12/1934 | Grubbs | 123/198 F |
| 2,019,252 | 10/1935 | Cottingham | 123/90.16 |
| 2,098,115 | 11/1937 | Voorhies | 123/198 F |
| 2,394,738 | 2/1946 | Anthony | 123/198 F |
| 2,503,930 | 4/1950 | Winkler et al. | 123/90.16 |
| 2,948,274 | 8/1960 | Wood | 123/198 F |
| 4,050,435 | 9/1977 | Fuller, Jr. et al. | 123/198 F |

*Primary Examiner*—Ira S. Lazarus
*Attorney, Agent, or Firm*—Robert W. B. Dickerson

[57] ABSTRACT

Control device for saving fuel in multi-cylinder engines wherein any selected number of cylinders may be removed from the power cycle of the engine by selectively bringing into and out of working operation the intake and exhaust valves of the respective cylinders. Such cylinders each have movable intake and exhaust push rods in mechanical relation to the rocker arms of the engine for forcing the rocker arms to selectively open and close the intake and exhaust valves. Hydraulic fluid is selectively connected in fluid communication with such intake push rods and exhaust push rods. Control members connected to the hydraulic fluid supply govern the fluid communication between the hydraulic fluid supply and the intake push rods and exhaust push rods for selectively opening the exhaust valves and selectively closing said intake valves to remove selected cylinders from the power cycle of the engine and for returning said cylinders back to the normal operation of an internal combustion engine, when more power is needed from the engine.

5 Claims, 6 Drawing Figures

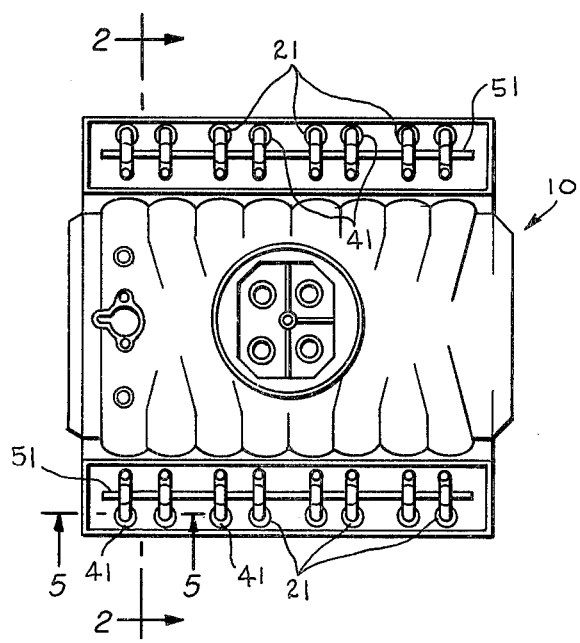
fig.1
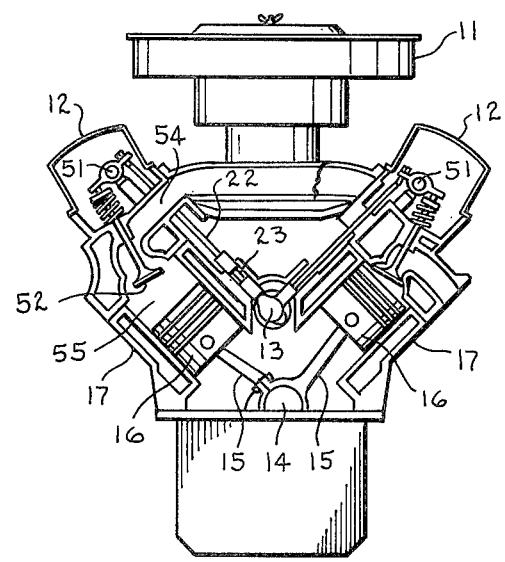
fig.2
fig.3
fig.4

DEVICE FOR SELECTIVELY CONTROLLING THE NUMBER OF OPERATIVE CYLINDERS IN MULTI-CYLINDER INTERNAL COMBUSTION ENGINES

BACKGROUND OF THE INVENTION

This invention relates to cylinder controls for saving fuel in multi-cylinder internal combustion engines by selectively controlling the number of cylinders brought into the power cycle of an engine through the selective closing of an intake valve and the opening of the exhaust valve of those cylinders taken from the power cycle, and for returning all cylinders to normal engine operation when maximum power is required from the engine. Such removal of cylinders from the power cycle of the engine will produce a corresponding saving in fuel when the additional power of the engine is not needed. The art of modifying engines for the purpose of removing cylinders from operation is not new per se, as can be seen from U.S. Pat. Nos. 1,985,447; 2,250,814; 2,394,738; 2,652,038; 3,520,287; 1,350,989; 2,392,933; 2,528,983; 1,977,778, 3,945,367; and Dec. 6, 1976 issue of MONEYSWORTH. Such examples of some of the prior art represented attempts to accomplish the novel result obtained in this invention. Such examples of the prior art required complicated changes to the existing engine which, therefore, made the process of controlling the valves a very expensive and undesirable proposition. For example, in the patent of Weiss, U.S. Pat. No. 2,528,983, a whole series of special cams are required for closing of certain cylinders from the power operation of the engine rather than utilizing a standard or existing internal combustion engine with only minor modifications. The expense of such major modifications to the internal combustion engine being such that the corresponding fuel saving would not make an economically-justifiable benefit. In U.S. Pat. No. 3,520,287, this prior art utilized hydraulic fluids and check valves to form a hydraulic lock to keep the exhaust valves at least partially open thereby removing a cylinder from operation; however, again substantial modification of the engine is required in order to provide for a reciprocating valve bridge which can then be slidably moved in order to close the valves from operation.

Even the prior art of L. P. Anthony, which provides for the driving of the push rods downward against the cam shafts in order to hold the push rod on the lifter and effect the result of opening the valve, requires substantial modification of the existing engine to accomplish the results which are simply accomplished by the operation of this invention.

DESCRIPTION OF THE DRAWINGS

FIG. 1 is a generalized plan view of an internal combustion engine having the cylinder covers and carburator removed;

FIG. 2 is a cross-sectional view taken along lines 2—2 of the generalized engine of FIG. 1;

FIG. 3 is a schematic depicting the overall operation of this invention, with all cylinders operative;

FIG. 4 is a schematic depicting the overall operation of this invention, with selective cylinders inoperative;

DESCRIPTION OF A PREFERRED EMBODIMENT

Figure 5:
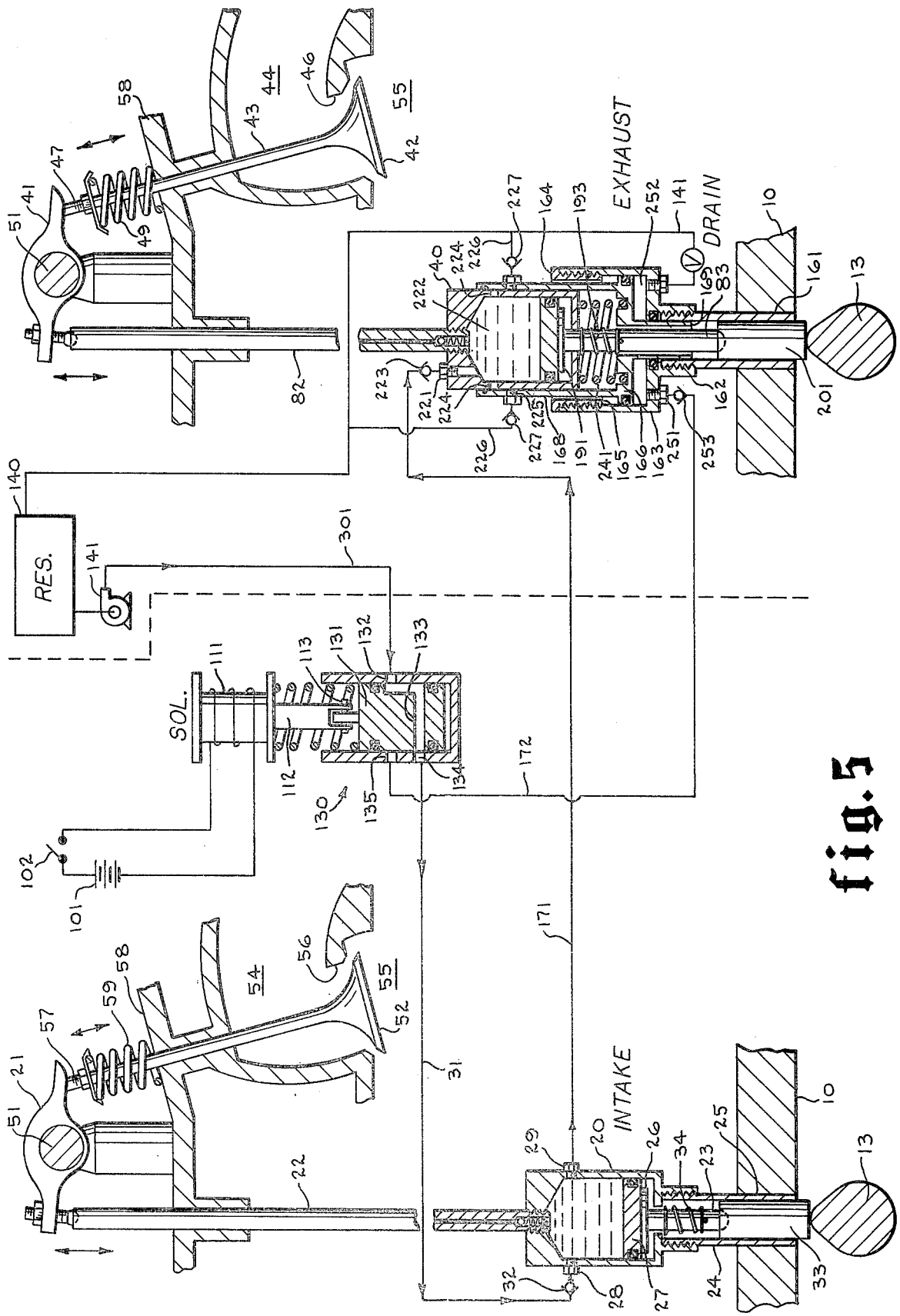
FIG. 5 is a cross-sectional view taken along lines 5—5 of FIG. 1, with all cylinders operative, and that portion of the Figure to the right of the dashed lines being rotated 90° for ease of depiction.

Looking first at the presentation of FIG. 1, a generalized engine is illustrated by the numeral 10. On opposite sides thereof, the cylinder covers are removed, exposing some of the components of each of the eight cylinders present. Such components include intake valve rocker arms 21, and exhaust valve rocker arms 41, for each cylinder, as well as rocker arm pivot rods 51, for each bank of cylinders. The general operation of internal combustion engines being well known, such operation will not be explained, other than as applied to the embodiment of this invention.

FIG. 2 illustrates a section through the same engine, with carburator cover 11 and cylinder covers 12 in place. Further, a portion of cam shaft 13 is illustrated, activating the push rods in each of the depicted cylinders. Crank shaft 14, through piston rods 15, cause movement of pistons 16 in each cylinder housing 17. Although this will be expounded on hereafter, the left hand cylinder of FIG. 2 illustrates the fuel intake valve, such cylinder's exhaust valve being therebehind. The right hand cylinder illustrates its exhaust valve, with its fuel intake valve being therebehind. Further, the left hand cylinder will be shown to be adapted to be removed from the power cycle by this invention, while the right hand cylinder represents the normal or continuously operative cylinder.

The immediately preceding comment is intended to illustrate that provision can be made to remove any number of selected cylinders from the power cycle. For purposes of this application only a single cylinder, having the capability of being removed from the power cycle will be examined. It should be understood that merely by modifying additional cylinders and providing plural conduits from the hereinafter described control valve, more than one cylinder may be provided the capacity of this invention.

Consider now the schematic representation of FIGS. 3 and 4 for an overall explanation of the operation of this invention. Recall that in FIG. 3, the removable cylinder remains in the power cycle, while in FIG. 4, the same cylinder is removed therefrom. In each case, a source of electric power, such as battery 101, may activate solenoid 111 (also see FIGS. 5 and 6). A switch 102 controls such activation. The switch may be placed on a vehicle dash board. Plunger 112 of the solenoid, through its linkage 113 with valve body 131 of control valve 130, may, on tripping of switch 102, may shift the valve body 131 from the cylinder-operative position of FIGS. 3 and 5 to the cylinder-inoperative position of FIGS. 4 and 6. When operative, as in FIG. 3, hydraulic fluid from reservoir 140 is urged by pump 141 to force fluid through conduit 301 to inlet 132 of control valve 130. In the position of valve body 131, in FIGS. 3, 5, valve body passageway 133 communicates between inlet 132 and first exit 134 leading to intake push rod cylinder 20. Such cylinder 20 then communicates with exhaust push rod cylinder 40, such as through conduit 171. Thus, fluid from reservoir 140 in effect charges the entire system. Provision may be made to conduct fluid leakage back to reservoir 140, through conduit 141. Such reservoir may, if desired, comprise the engine crankcase.

Figure 6:
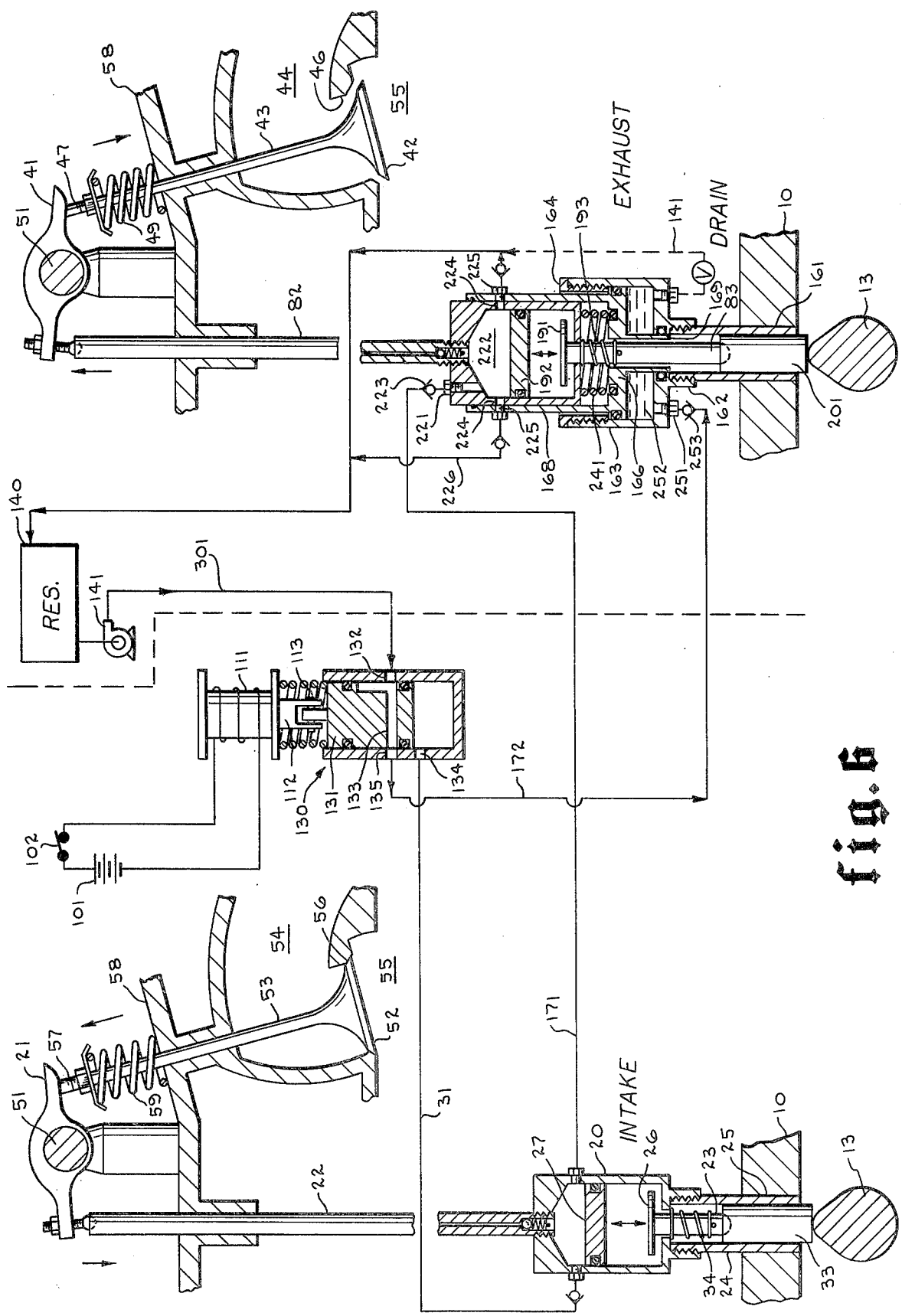
FIG. 6 is a view similar to FIG. 5, but with selective cylinders inoperative.

During the operation of FIGS. 4, 6, i.e., the cylinder-removal operation, Switch 102 would be closed, causing solenoid 111 to move valve body 131 to its upward position, establishing communication between valve inlet 132 and second exit 135, a conduit leading therefrom to exhaust push rod cylinder 40. Thus hydraulic fluid from reservoir 140 is moved by pump 141 to inlet 132 of control valve 130, through valve body passageway 133 to exit at 135. From there such hydraulic fluid would course through conduit 172 to a further cavity of exhaust push rod cylinder 40.

Consider now the structural arrangements of the intake push rod and valve mechanisms, and exhaust push rod and valve mechanisms, best illustrated in FIGS. 5 and 6. Recall that for ease of illustration, each such figure shows the respective mechanisms in side by side relationship, when in actuality one should be behind the other, i.e., the cams appearing on each side of the dashed line are cams on the same linear cam shaft 13.

The intake valve assembly includes linearly movable valve 52 affixed to valve stem 53. Such valve may block fuel passage through passageway 54 into combustion chamber 55, by seating on seat 56. Said stem 53 has one end 57 extending through a portion 58 of the engine block, and is biased toward valve closing by spring 59 against one side of intake valve rocker arm 21. As previously mentioned, rocker arm 21 pivots about rod 51, with the other side of said rocker arm being fixed to one end of one portion 22 of a bifurcated intake valve push rod, the other portion of such push rod being assigned numeral 23. The other end of rod portion 22 is shown threadedly engaged with cylinder 20. Opposite the threaded engagement with rod portion 22, cylinder 20 has a cylindrical skirt 24 movably positioned within an aperture 25 in block 10. Movable within cylinder 20 are piston 26 fixed to one end of push rod portion 23, and slave piston 27, the latter having a peripheral dynamic o-ring seal for sealing engagement with the interior wall of cylinder 20. Cylinder 20 also includes hydraulic fluid inlet 28 and outlet 29. Flexible conduit 31 communicatingly links control valve outlet 134 with cylinder inlet 28, check valve 32 being positioned within such conduit. Push rod portion 23 is engaged by lifter 33 and is biased toward engagement therewith by spring 34. Such spring bias retains said lifter in engagement with its associated cam on cam shaft 13.

Moving now to the exhaust assembly within the same engine cylinder under examination, linearly movable valve 42 is affixed to valve stem 43. Such valve may block the escape of combustion gases through exhaust passageway 44 from combustion chamber 55, by seating on seat 46. Said stem 43 has one end 47 extending through a portion 58 of the engine block, and is biased toward valve closing by spring 49. As previously mentioned, said rocker arm 41 pivots about rod 51, with one side of said rocker arm being fixed to one end of one portion 82 of a bifurcated exhaust valve push rod, the other portion of such push rod being assigned numeral 83. The other end of rod portion 82 is shown threadedly engaged with cylinder 40. Hollow shaft 161 is fixed at one end to block 10, the other end being threadedly engaged to nipple 162 of cup 163. An adjustable stop 164, having shoulder 165, is threaded to one end of cup 163. Dump piston 166 has first and second skirts 168, 169 depending therefrom, the latter skirt adapted to slidably receive push rod portion 83, and the former skirt adapted to slidably receive cylinder 40. Said rod portion 83 extends within cylinder 40, and has piston 191 affixed to one end. Said piston 191, and slave piston 192 are movable within piston 40. Spring 193 biases push rod portion 83 toward continued engagement with lifter 201, and it in turn with the associated cam of cam shaft 13.

Cylinder 40 includes fluid inlet 221 to receive fluid from conduit 171 into central reservoir 222, one way valve 223 being provided in said conduit. Cylinder 40 also includes hydraulic fluid outlet 224 which, on alignment with fluid outlet 225 of dump piston skirt 168, permits the exhausting of hydraulic fluid from piston reservoir 222, through flexible conduits 226, which may merge with conduit 141 to reservoir 140. Check valves 227 will limit directional flows through conduits 226. Spring 241 biases cylinder 40 so that fluid outlets 224, 225 are misaligned. Cup 163 includes hydraulic fluid inlet 251 to permit fluid exiting control valve outlet 135, and passing through flexible conduit 172 to enter reservoir 252. Check valve 253 may be positioned in conduit 172.

Consider now the overall operation of this invention. An engine has a plurality of cylinders. This invention is capable of removing selective ones of the cylinders from the power cycle. Each cylinder would include an intake valve system and an exhaust valve system. The description herein has been directed to the selective removing of only one such cylinder, but it is obvious that the control valve 130 can control a plurality of chosen cylinders merely by adding branch conduits leading from fluid exits 134, 135. In any case, FIGS. 5 and 6 illustrate one of such chosen cylinders. As mentioned, each such cylinder includes an intake system and an exhaust system. FIG. 5 illustrates such cylinder being included in the overall power cycle, and FIG. 6 illustrates such cylinder being removed therefrom. During engine operation, the crank shaft is causing reciprocation of pistons 16 and the cam shaft is causing reciprocation of lifters 33 and 201, and fuel is supplied passageway 54. In either case, pump 141 will urge hydraulic fluid from a reservoir 140 (which may be the crank case or an independent reservoir) through conduit 301 to inlet 132 of control valve 130. By manually or otherwise operating switch 102, the solenoid controlled control valve directs the flow of such fluid. When it is desired to retain the cylinder in the power cycle, switch 102 is left open. The hydraulic fluid then will exit through outlet 134, pass through conduit 31, enter intake cylinder 20 through inlet 28. On the cylinder being filled, surplus fluid will pass exit 29, through conduit 171 to enter reservoir 222 of exhaust cylinder 40 through inlet 221, thus essentially charging the system. Thereafter, on the intake cam urging intake lifter 33 upwardly, push rod portion 23, slave piston 27, intake cylinder 20 and push rod portion 22 will be hydraulically caused to move as a unit, rotating rocker arm 21 so as to unseat valve 52 from seat 56 to admit fuel into combustion chamber 55, whereon combustion may be caused by piston 16 in a normal manner. On the associated cam further rotating, spring 34 urges the push rod and lifter downward so as to retain lifter 33 in force transmitting relationship with such cam. Conjointly, in the proper sequence, fluid will enter reservoir 222 of exhaust cylinder 40 through inlet 221, to fill such reservoir. Note that fluid exits 224, 225 are misaligned, to prevent fluid escape. Thus, in the same manner as in the intake cylinder, on the cam moving lifter 201 upwardly, push rod portion 83, slave piston 192, cylinder 40 and push rod portion 82 will by hydraulically caused to act as a unit, rotating rocker arm 41, causing valve 42 to be unseated from seat 46, permitting the escape of exhaust gases through passageway 44 to the normal exhaust system.

Now consider the operation of the selected cylinder 5 when such cylinder is removed from the power cycle, by closing switch 102. The solenoid will lift valve body 131 so as to connect control valve inlet 132 with outlet 135, disconnecting outlet 134 from inlet 132. Fluid then may course through conduit 172 to enter cup reservoir 252 through inlet 251. As seen in FIG. 6, this urges piston 166 upwardly until it contacts shoulder 165, allows communication between exits 224, 225 so as to dump fluid from reservoir 222 through conduit 226 back into reservoir 140. Fluid remaining within intake cylinder may have been forced through conduit 171, into reservoir 222 to also be dumped. Therafter, when the cam shaft urges lifters 33, 201 upwardly, pistons 26, 191 merely reciprocate within the respective cylinders 20, 40 without causing rocker arms 21, 41 to rotate. Intake valve 52 remains seated preventing further fuel entry. Exhaust valve 42 remains slightly unseated, so that any residual gases may escape through the exhaust system, and to prevent an air lock. On the opening of switch 102, the check valve in conduit 141 may permit draining of hydraulic fluid from reservoir 252.

Although only a single embodiment of this invention has been described, it should be obvious that numerous modifications would be possible by one skilled in the art without departing from the spirit of the invention, the scope of which is limited only by the following claims.

What is claimed is:

1. In an engine having a hydraulic system, a fuel system, cam-carrying cam shaft and multiple combustion cylinders, each cylinder having an intake valve, exhaust valve, and said engine having means for selectively removing and returning one or more cylinders from and to the power cycle, the improvement comprising:

control means for (1) selectively providing hydraulic fluid from said hydraulic system to permit the opening of the intake valve in selected combustion cylinders chosen to remain in said power cycle, and (2) selectively withholding hydraulic fluid from selected cylinders to bar the opening of the intake valve in such selected combustion cylinders chosen to be withdrawn from such power cycle; and said control means further having combination means therein for 1 selectively providing hydraulic fluid to selected combustion cylinders to cause the reciprocation of an exhaust valve in said selected combustion cylinders chosen to remain in the power cycle, and 2 selectively providing said hydraulic fluid to such selected combustion cylinders to bar such reciprocation.

2. The device of claim 1 wherein said control means further includes valve means shiftable from a first position permitting opening of said selected intake valves to a second position preventing such opening of said selected intake valves, said selected intake valves being in series hydraulic communication with their respective exhaust valves when said valve means is in said first position.

3. The device of claim 1 wherein said control means further includes switch controlled solenoid means for governing the position of said valve means.

4. The device of claim 2 wherein said control means further includes, in each cylinder controlled thereby, a bifurcated intake push rod linked to said intake valve by a push rod, one portion of said intake push rod being in force transmitting relationship with one of said cam shaft cams, and said control means further including combination means for (1) hydraulically linking said bifurcated portions of said intake push rods when said valve means is in said first position, and (2) unlinking such hydraulic linkage when said valve means is in said second position.

5. The device of claim 4 wherein each combustion cylinder includes an intake valve cylinder and an exhaust valve cylinder, said exhaust valve cylinder including a pair of piston chambers, the first of such chambers being in series communication with an associated intake valve cylinder when said valve means is in said first position, and the second of such chambers being in fluid communication with said hydraulic system when said valve means is in said second position.

* * * * *